US012572062B2

(12) United States Patent
Hirahara

(10) Patent No.: US 12,572,062 B2
(45) Date of Patent: Mar. 10, 2026

(54) LIGHT SOURCE DEVICE AND PROJECTOR

(71) Applicant: Sharp NEC Display Solutions, Ltd., Tokyo (JP)

(72) Inventor: Sota Hirahara, Tokyo (JP)

(73) Assignee: Sharp Display Solutions, Ltd., Tokyo (JP)

( * ) Notice: Subject to any disclaimer, the term of this patent is extended or adjusted under 35 U.S.C. 154(b) by 560 days.

(21) Appl. No.: 18/011,935

(22) PCT Filed: Jun. 25, 2020

(86) PCT No.: PCT/JP2020/024994
§ 371 (c)(1),
(2) Date: Dec. 21, 2022

(87) PCT Pub. No.: WO2021/260877
PCT Pub. Date: Dec. 30, 2021

(65) Prior Publication Data
US 2023/0244131 A1     Aug. 3, 2023

(51) Int. Cl.
*G03B 21/20*        (2006.01)
*G02B 26/00*        (2006.01)

(52) U.S. Cl.
CPC ......... *G03B 21/204* (2013.01); *G02B 26/008* (2013.01); *G03B 21/2066* (2013.01); *G03B 21/208* (2013.01)

(58) Field of Classification Search
CPC .............. G03B 21/204; G03B 21/2066; G03B 21/208; G03B 21/2013; G03B 21/2033;
(Continued)

(56) References Cited

U.S. PATENT DOCUMENTS

2012/0275146 A1*  11/2012  Huang ............... G03B 21/2033
                                              362/230
2014/0285774 A1*   9/2014  Tajiri ..................... G03B 21/28
                                              353/38
(Continued)

FOREIGN PATENT DOCUMENTS

JP        2012-138608 A    7/2012
JP        2016-142901 A    8/2016
(Continued)

OTHER PUBLICATIONS

International Search Report (ISR) (PCT Form PCT/ISA/210), in PCT/JP2020/024994, dated Aug. 25, 2020.

*Primary Examiner* — Magda Cruz
(74) *Attorney, Agent, or Firm* — McGinn IP Law Group, PLLC

(57)        ABSTRACT
A light source device includes a laser source unit, a rotating body including a phosphor layer and a reflective diffusion plate, and an optical path forming member that divides the emitted light of the laser source unit into a first laser beam and a second laser beam, irradiates the reflective diffusion plate with the first laser beam, and irradiates the phosphor layer with the second laser beam. The optical path forming member includes a first reflection plate with a through-hole and a first collimator lens. The first laser beam passes through the through-hole and the first collimator lens in that order and enters the reflective diffusion plate, and the diffused light from the reflective diffusion plate passes through the first collimator lens and enters the first reflection plate.

7 Claims, 8 Drawing Sheets

(58) Field of Classification Search
CPC ...... G03B 21/00; G03B 21/14; G02B 26/008;
G02B 27/141; F21S 2/00
USPC ................................................. 353/97, 98
See application file for complete search history.

(56) References Cited

U.S. PATENT DOCUMENTS

| | | | |
|---|---|---|---|
| 2015/0124430 A1 | 5/2015 | Mehl | |
| 2019/0346753 A1 | 11/2019 | Pan | |
| 2020/0124956 A1* | 4/2020 | Hirasawa | ............. H04N 9/3194 |

FOREIGN PATENT DOCUMENTS

| | | |
|---|---|---|
| JP | 2017-009690 A | 1/2017 |
| JP | 2017-040778 A | 2/2017 |
| WO | WO 2016/080295 A1 | 5/2016 |

* cited by examiner

[Fig. 1]
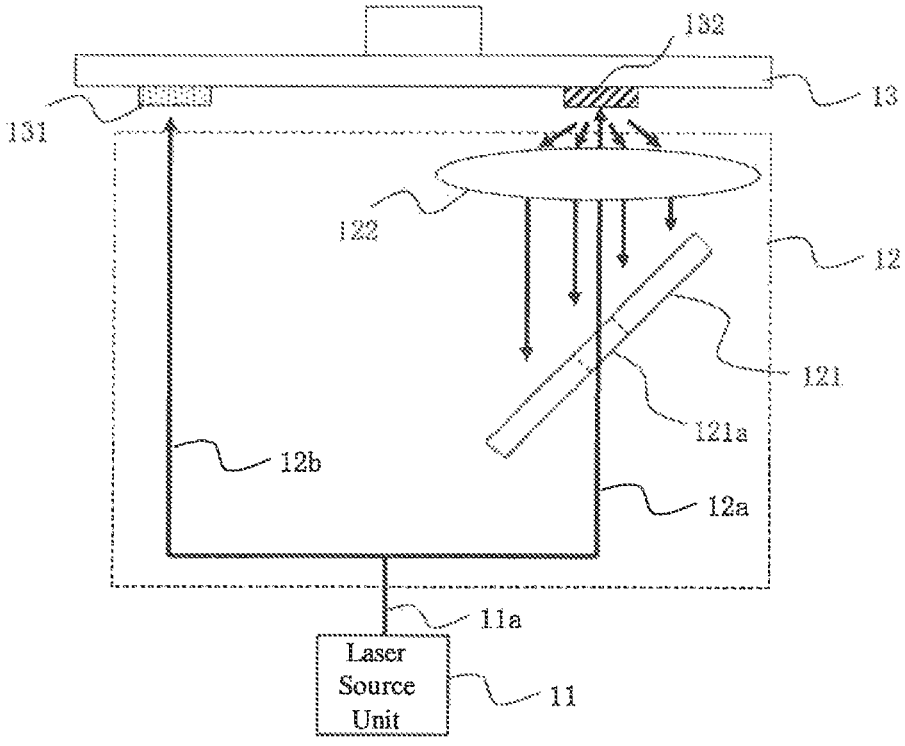
[Fig. 2]
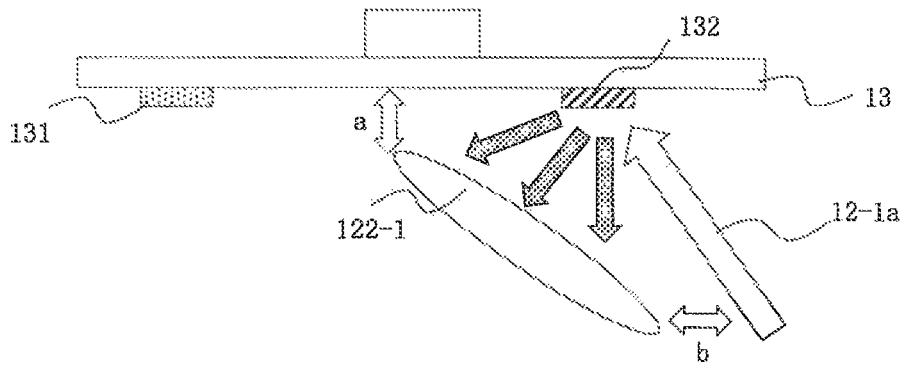

[Fig. 3]
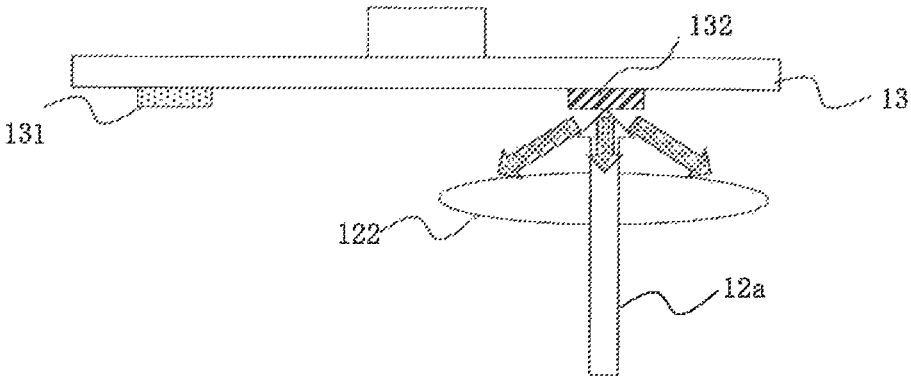
[Fig. 4]
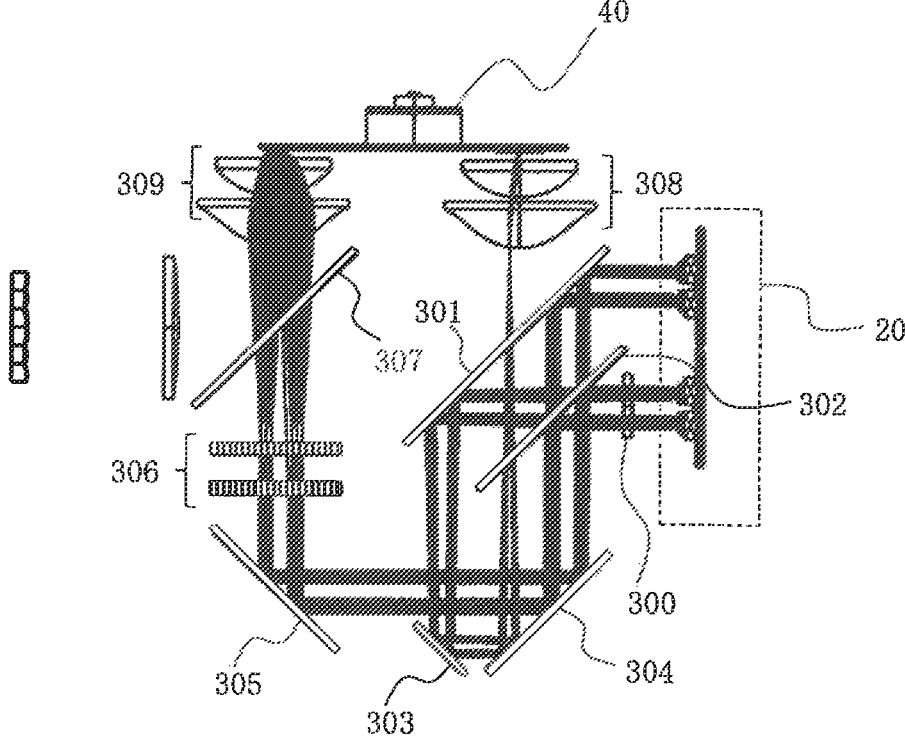

[Fig. 5]
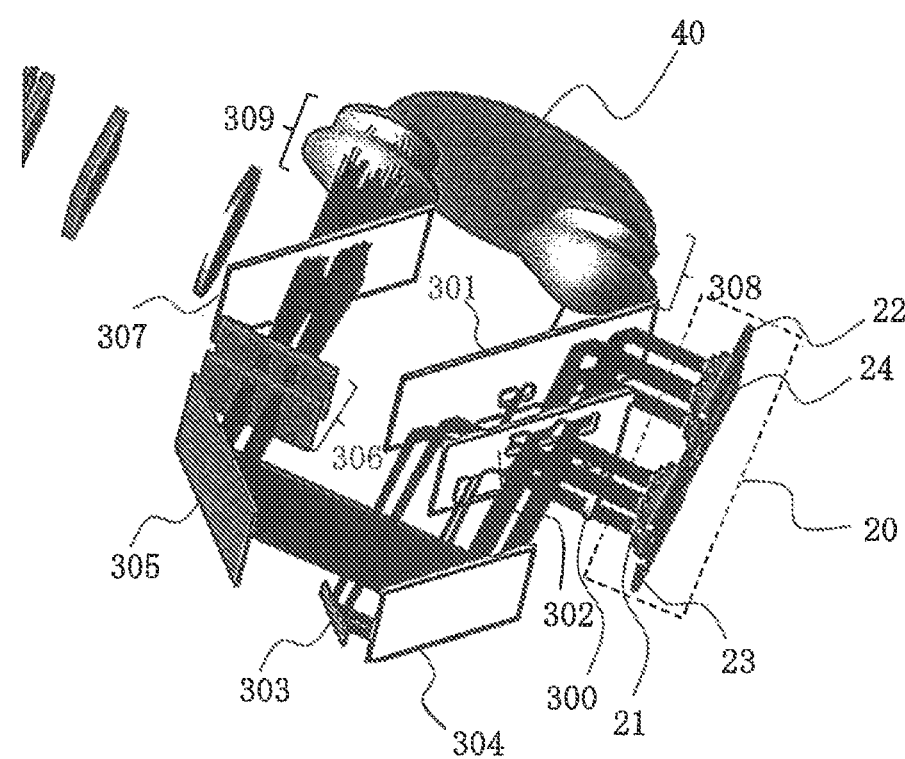
[Fig. 6]
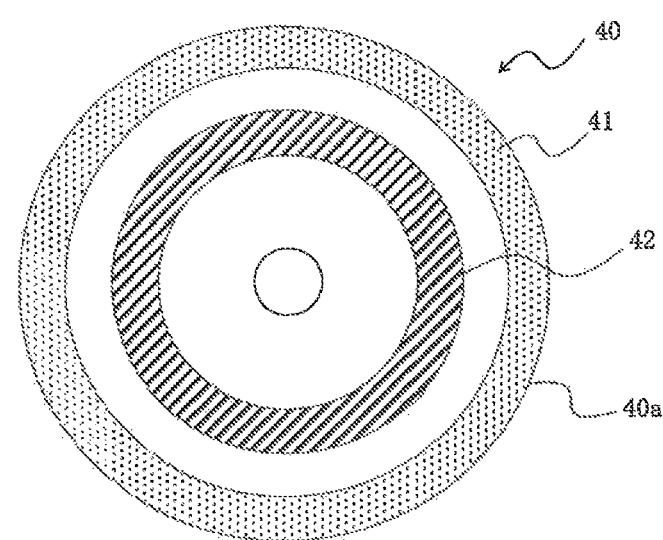

[Fig. 7]
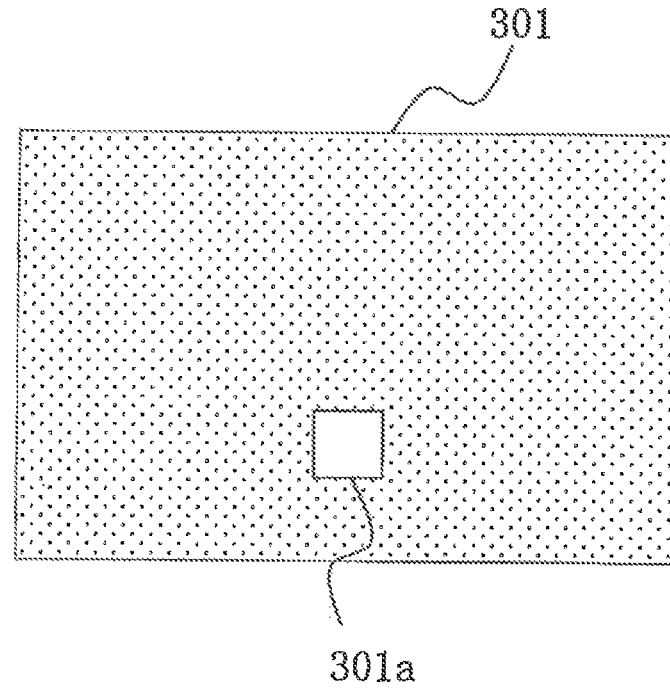
301
301a
[Fig. 8]
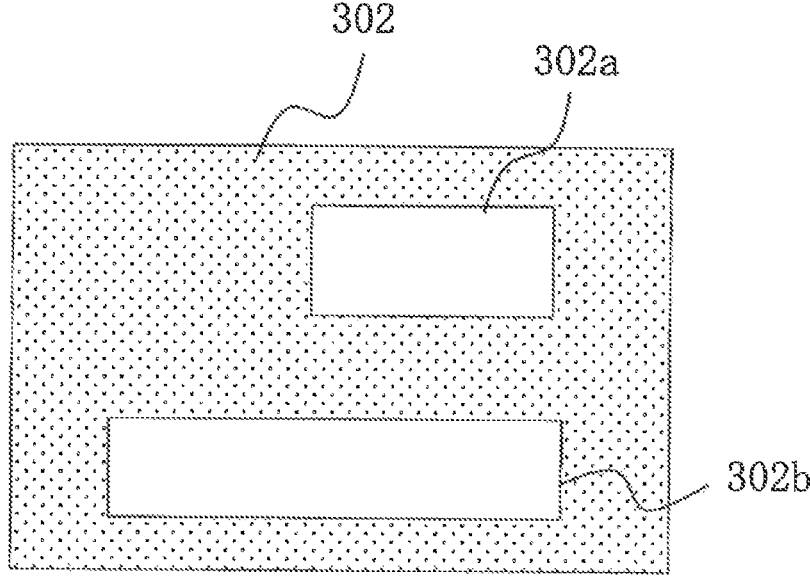
302
302a
302b

[Fig. 9]
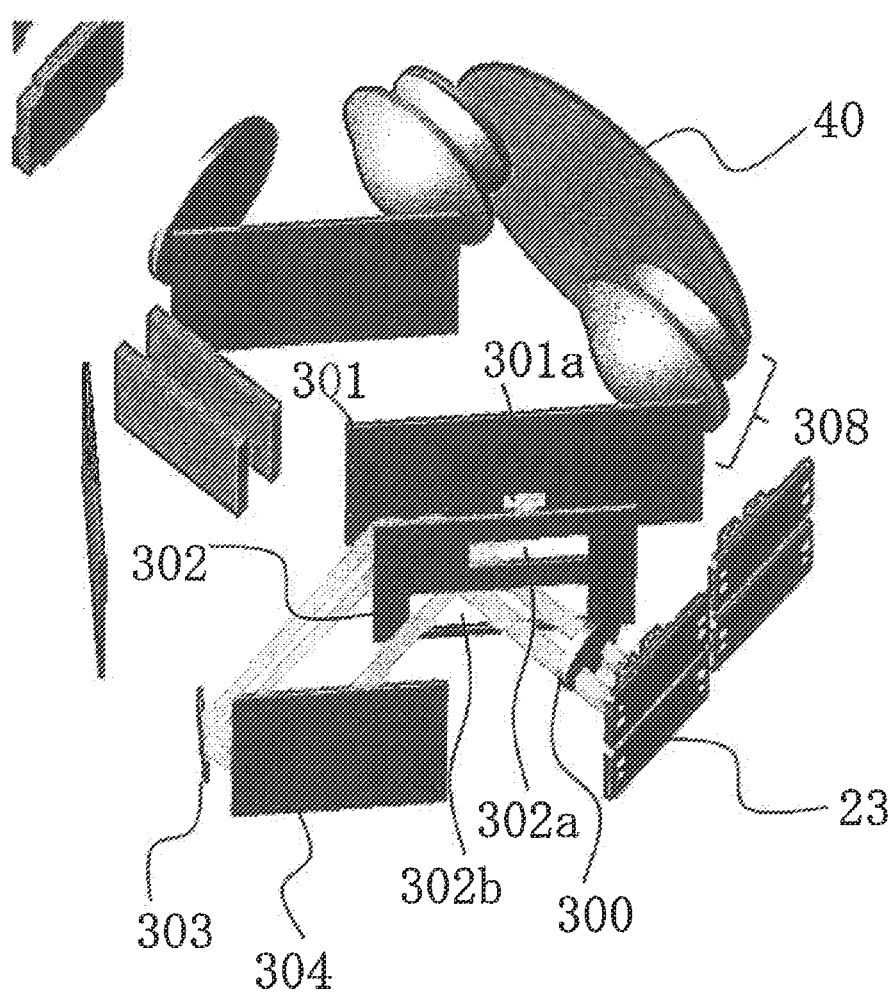

[Fig. 10]
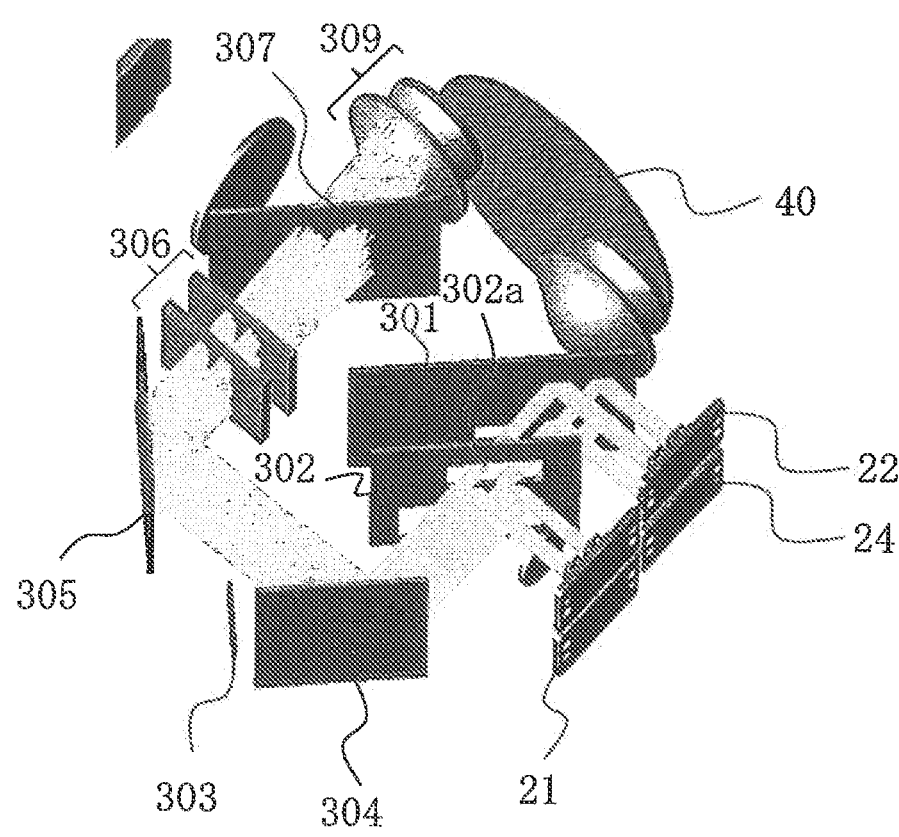

[Fig. 11]
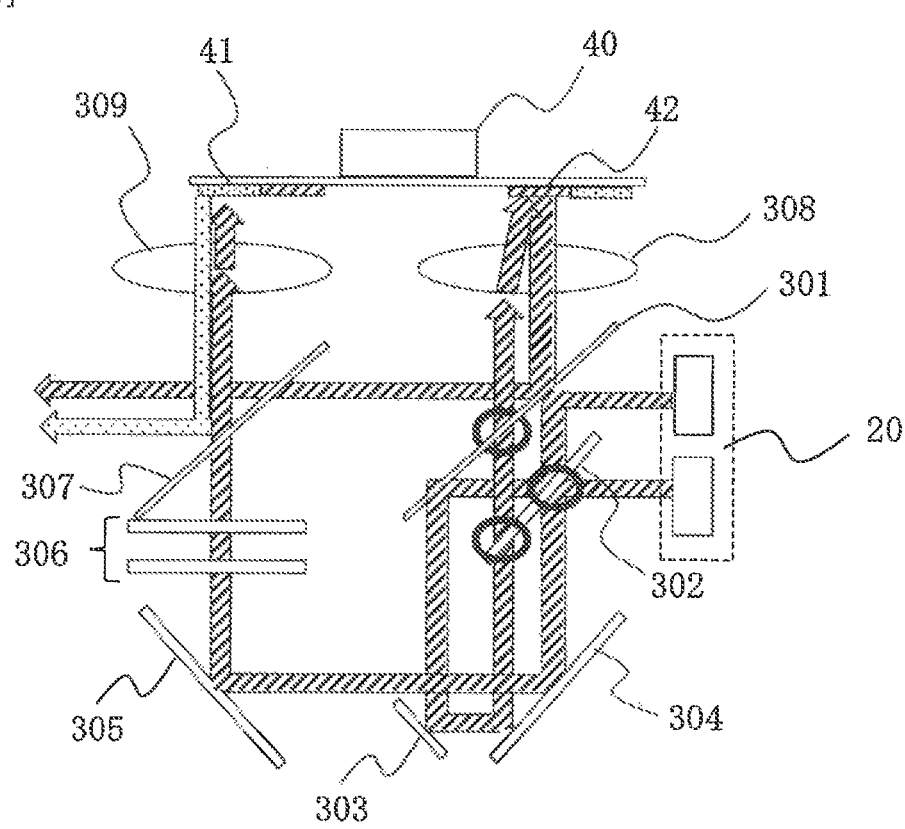
[Fig. 12]
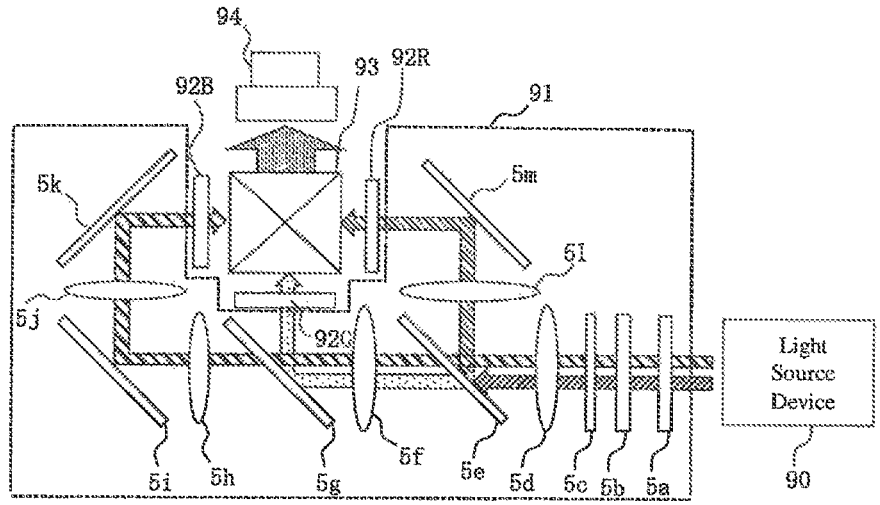

[Fig. 13]
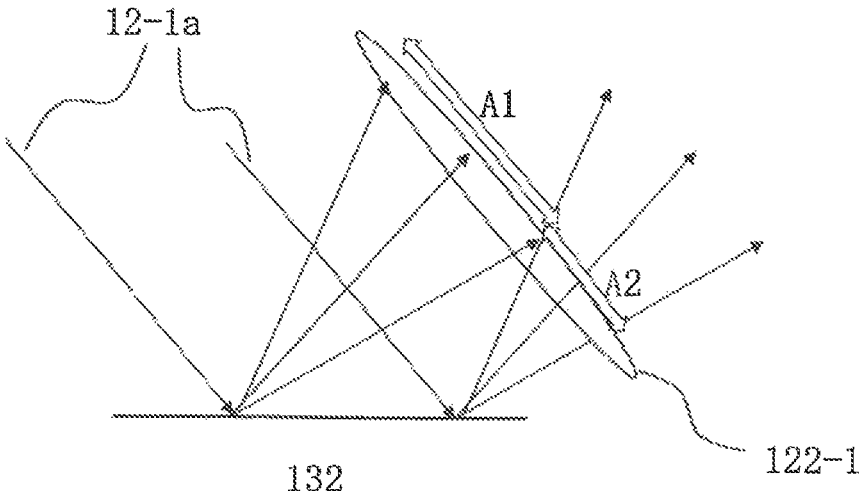

LIGHT SOURCE DEVICE AND PROJECTOR

TECHNICAL FIELD

The present invention relates to alight source device and a projector.

BACKGROUND ART

In a projector in which a laser beam is modulated to form an image, speckle-like noise called speckle is generated in the projection image. In order to reduce the speckle noise, a diffuser is generally disposed on the optical path of the laser beam.

As the diffuser, a reflective diffusion plate and a transmissive diffusion plate have been provided. Since the reflective diffusion plate is perfect diffusion, the reflective diffusion plate is useful for reducing speckle noise. The reflective diffusion plate is inexpensive compared with the transmissive diffusion plate. However, a configuration in which a laser beam is reflected by a reflective diffusion plate further requires a means for separating the incident light and the reflected light.

Patent Document 1 discloses a light source device that includes a laser source and a wheel in which a phosphor layer and a reflective diffusion plate are provided on the same surface. In this configuration, light emitted from the laser source is divided into excitation light and blue light, the phosphor layer is irradiated with the excitation light, and the reflective diffusion plate is irradiated with the blue light. In this light source device, the blue light is obliquely incident to the reflective diffusion plate so that the incident light and the reflected light are separated from each other. The diffused light emitted from the reflective diffusion plate passes through a plurality of mirrors and then enters a collimator lens. The collimator lens converts the diffused light into pseudo-parallel light.

PRIOR ART DOCUMENT

Patent Document

Patent Document 1: JP-A-2012-138608

DISCLOSURE OF THE INVENTION

Problems to be Solved by the Invention

However, the light source device described in Patent Document 1 has the following problems.

As the distance from the reflective diffusion plate increases, the diameter of the luminous flux of the diffused light also increases. In the light source device described in Patent Document 1, since the collimator lens that converts the diffused light into parallel light flux is provided at a position remote from the reflective diffusion plate, the collimator lens is increased in size.

Further, as the diffusion angle of the diffused light from the reflective diffusion plate that is incident on the collimator lens increases, the effect of reducing speckle noise also increases. Here, the diffusion angle is defined by an angle formed by light rays passing along the upper and lower edges (or the left and right edges) of the luminous flux of the diffused light. However, in the light source device described in Patent Document 1, since the reflective diffusion plate is remote from the collimator lens, the diffusion angle cannot be increased. Therefore, speckle noise cannot be sufficiently reduced in some cases.

An object of the present invention is to provide a light source device and a projector capable of solving the above problem and sufficiently reducing speckle noise.

Means for Solving the Problem

In order to achieve the above object, a light source device of the present invention includes a laser source unit that emits a laser beam, a rotating body in which a phosphor layer and a reflective diffusion plate are provided on the same surface, and an optical path forming member that divides emitted light from the laser source unit into a first laser beam and a second laser beam, irradiates the reflective diffusion plate with the first laser beam, and irradiates the phosphor layer with the second laser beam. The optical path forming member includes a first reflection plate that is provided on the optical path of the first laser beam and that has a through-hole, and a first collimator lens that is provided between the first reflection plate and the reflective diffusion plate. The first laser beam passes through the through-hole and the first collimator lens in that order and enters the reflective diffusion plate, and diffused light, which is reflected light emitted from the reflective diffusion plate, passes through the first collimator lens and enters the first reflection plate. The first collimator lens condenses the first laser beam on the reflective diffusion plate and collimates the diffused light.

The projector of the present invention includes the above-described light source device, an optical modulation unit that modulates light emitted from the light source device to form an image, and a projection lens that projects the image formed by the light modulation unit.

Effect of the Invention

According to the present invention, it is possible to prevent an increase in the size of the collimator lens and to sufficiently reduce speckle noise.

BRIEF DESCRIPTION OF THE DRAWINGS

FIG. 1 is a block diagram showing the configuration of a light source device according to a first embodiment of the present invention.

FIG. 2 is a schematic diagram showing the arrangement of a collimator lens of a comparative example.

FIG. 3 is a schematic diagram showing the arrangement of a first collimator lens in a light source device according to the first embodiment of the present invention.

FIG. 4 is a side view showing the configuration of a light source device according to a second embodiment of the present invention.

FIG. 5 is a perspective view showing the configuration of a light source device according to the second embodiment of the present invention.

FIG. 6 is a front view schematically showing the configuration of a phosphor wheel.

FIG. 7 is a front view schematically showing the configuration of a reflection plate.

FIG. 8 is a front view schematically showing the configuration of another reflection plate.

FIG. 9 is a schematic view showing the optical path of a first laser beam as blue light.

FIG. 10 is a schematic view showing the optical path of a second laser beam as excitation light.

FIG. 11 is a schematic diagram showing all optical paths including those for fluorescent light and diffused light.

FIG. 12 is a schematic diagram showing the configuration of a projector according to an embodiment of the present invention.

FIG. 13 is a schematic view for explaining a region of passage of diffused light of the comparative example shown in FIG. 2.

BEST MODE FOR CARRYING OUT THE INVENTION

Next, an embodiment of the present invention will be described with reference to the drawings.

First Embodiment

FIG. 1 is a block diagram showing the configuration of a light source device according to the first embodiment of the present invention. Note that, in FIG. 1, optical paths and optical elements are schematically illustrated, and these optical paths and optical elements may be different in size, shape, and the like from an actual example.

Referring to FIG. 1, the light source device includes laser source unit 11, optical path forming member 12, and rotating body 13. Laser source unit 11 emits a laser beam. Rotating body 13 includes a rotatable substrate (for example, a wheel), phosphor layer 131 and reflective diffusion plate 132 being provided on the same surface of the substrate. Phosphor layer 131 includes a phosphor that is excited by the laser beam and emits fluorescent light.

Reflective diffusion plate 132 reflects and diffuses the laser beam. Reflective diffusion plate 132 is an existing diffuser. For example, when the substrate of rotating body 13 is a glass substrate, reflective diffusion plate 132 may be formed by laminating a reflective layer and a diffuser layer on the glass substrate. Further, the reflective diffusion plate 132 may be formed by subjecting one surface of a glass substrate to uneven processing for diffusing light and further depositing a metal reflective film on the other surface of the glass substrate. In addition, in a case in which the substrate of rotating body 13 is made of a substrate such as metal, reflective diffusion plate 132 may be formed by performing uneven processing for diffusing light on one surface of the substrate.

Optical path forming member 12 is configured to divide emitted light 11a from laser source unit 11 into first laser beam 12a and second laser beam 12b, irradiate reflective diffusion plate 132 with first laser beam 12a, and irradiate phosphor layer 131 with second laser beam 12b. Optical path forming member 12 includes first reflection plate 121 that is provided on the optical path of first laser beam 12a and that has through-hole 121a, and first collimator lens 122 that is provided between first reflection plate 121 and reflective diffusion plate 132. First reflection plate 121 can be manufactured, for example, by first forming through-hole 121a in a predetermined portion of a substrate such as glass and then depositing a metal reflective film on one surface or both surfaces of the substrate in which through-hole 121a is formed.

In optical path forming member 12, first laser beam 12a passes through through-hole 121a and first collimator lens 122 in that order and enters reflective diffusion plate 132. The diffused light, which is the reflected light that is emitted from reflective diffusion plate 132, passes through first collimator lens 122 to enter first reflection plate 121. First collimator lens 122 condenses first laser beam 12a on reflective diffusing plate 132 and collimates the diffused light. Here, the diffused light is perfect diffuse light.

In the light source device of the present embodiment, first laser beam 12a that is incident light to reflective diffusion plate 132 passes through through-hole 121a, and the diffused light that is the reflected light from reflective diffusion plate 132 is reflected by first reflection plate 121, whereby the incident light is separated from the reflected light. According to this separation configuration, first laser beam 12a can be made substantially perpendicularly incident to reflective diffusion plate 132, and a central ray of the diffused light can be made to substantially coincide with first laser beam 12a. First collimator lens 122 is arranged such that the central ray of the diffused light passes through the center of the lens. Accordingly, first collimator lens 122 may be disposed adjacent to and facing reflective diffusion plate 132. Therefore, according to the light source device of the present embodiment, it is possible to prevent an increase in the size of the collimator lens as compared with the light source device described in Patent Document 1 in which the collimator lens is disposed at a position remote from the reflective diffusion plate.

Further, in the light source device described in Patent Document 1, since a mirror or the like for making blue light obliquely incident to the reflective diffusion plate is three-dimensionally arranged, the size of the light source device is increased. On the other hand, according to the light source device of the present embodiment, since first laser beam 12a can be substantially perpendicularly incident to reflective diffusion plate 132, an optical member such as a reflector for forming the optical path of first laser beam 12a can be two-dimensionally arranged. Therefore, the size of the light source device can be reduced.

In addition, according to the light source device of the present embodiment, since the diffusion angle of the diffused light can be increased, speckle noise can be sufficiently reduced. Here, the diffusion angle is defined by the angle formed by light rays passing through the upper and lower edges (or left and right edges) of the luminance flux of the diffused light incident to first collimator lens 122 from reflective diffusion plate 132. Since the optical path lengths of each of the beams within the range of the diffusion angle are different from each other, phase differences corresponding to the differences in the optical path lengths are generated between the respective beams. Due to these phase differences, speckle noise is reduced. According to this principle, as the diffusion angle of the diffused light incident to first collimator lens 122 increases, the effect of reducing speckle noise is also increased. According to the light source device of the present embodiment, since first collimator lens 122 is disposed to be close to and face reflective diffusion plate 132, the diffusion angle of the diffused light can be increased, and the effect of reducing speckle noise can thus be increased.

Hereinafter, the speckle noise reduction effect will be described in detail by taking as a comparative example a configuration in which the laser beam is obliquely incident to the reflective diffusion plate.

FIG. 2 schematically illustrates the arrangement of the collimator lens of the comparative example. In the comparative embodiment shown in FIG. 2, laser beam 12-1a is obliquely incident to reflective diffusion plate 132. Collimator lens 122-1 is disposed in an inclined state with respect to reflective diffusion plate 132 so that the central ray of the diffused light passes through the center of the lens. In this comparative example, collimator lens 122-1 must be arranged so as not to interfere with each of rotating body 13 and laser beam 12-1a that is the incident light. That is, distance a between the end portion of collimator lens 122-1 and rotating member 13 and distance b between the end portion of collimator lens 122-1 and laser beam 12-1a need to be fully secured. As described above, since there is a physical restriction on the size and arrangement of collimator lens 122-1, the diffusion angle of the diffused light incident to collimator lens 122-1 from reflective diffusion plate 132 cannot be made too large.

On the other hand, as shown in FIG. 3, first collimator lens 122 according to the light source device of the present embodiment is close to and faces reflective diffusion plate 132. The optical axis of first collimator lens 122 is substantially orthogonal to the incident surface of reflective diffusion plate 132, and both first laser beam 12a as the incident light and the diffused light as the reflected light pass through first collimator lens 122. In this case, since there is no restriction on the size or the arrangement, the diffusion angle of the diffused light incident on first collimator lens 122 from reflective diffusion plate 132 can be increased. Therefore, since the diffusion angle can be increased as compared with the configuration of the comparative example, the effect of reducing speckle noise can be increased.

In the light source device of the present embodiment, the configuration shown in FIG. 1 is an example, and can be changed as appropriate.

For example, optical path forming member 12 may further include a second reflection plate that is arranged in parallel with first reflection plate 121 on the optical path of emitted light 11a of laser source unit 11, the second reflection plate having first and second through-holes. In this case, a portion of emitted light 11a of laser source unit 11 passes through the first through-hole of the second reflection plate, and the light that passes through the first through-hole forms first laser beam 12a. The remaining portion of emitted light 11a of laser source unit 11 may be reflected by first reflection plate 121 and the second reflection plate, the reflected light from first reflection plate 121 may pass through the second through-hole of the second reflection plate, and light that passes through the second through-hole and the reflected light from the second reflection plate may form second laser beam 12b.

Further, laser source unit 11 may include a plurality of laser modules that each includes a plurality of laser diode chips. In this case, light emitted from at least one laser module may pass through the first through-hole of the second reflection plate.

In the above case, optical path forming member 12 may further include a condenser lens that is provided between the at least one laser module and the second reflection plate. In this case, through-hole 121a of first reflection plate 121 may be disposed at the condensing position of the laser beam condensed by the condenser lens.

Optical path forming member 12 may further include a dichroic mirror that is provided on the optical path of second laser beam 12b, that transmits second laser beam 12b, and that reflects fluorescent light emitted from phosphor layer 131. In this case, first reflection plate 121 may reflect the diffused light emitted from reflective diffusion plate 132 toward the dichroic mirror, and the dichroic mirror may color-synthesize the diffused light reflected by first reflection plate 121 and the fluorescent light into one optical path.

Further, optical path forming member 12 may further include a second collimator lens that is provided between the dichroic mirror and phosphor layer 131. In this case, the second collimator lens focuses second laser beam 12b on phosphor layer 131 to collimate the fluorescent light.

Further, a projector may be provided that includes the light source device of the present embodiment described above, a light modulation unit that modulates the emitted light of the light source device to form an image, and a projection lens that projects the image formed by the light modulation unit.

Second Embodiment

FIG. 4 and FIG. 5 are diagrams schematically illustrating the configuration of a light source device according to the second embodiment of the present invention. FIG. 4 is a side view of all optical paths as viewed from the side. FIG. 5 is a perspective view of all optical paths. In FIG. 4 and FIG. 5, optical paths and optical elements are schematically illustrated, and these optical paths and optical elements may be different in size, shape, and the like from an actual example.

As illustrated in FIGS. 4 and 5, the light source device includes laser source unit 20, optical path forming member 30, and phosphor wheel 40. Laser source unit 20 includes four laser modules 21 to 24. Each of laser modules 21 to 24 includes a plurality of laser diode (LD) chips. The number of LD chips mounted on one laser module is, for example, 20 or 24. Here, a blue LD is used. Laser modules 21 to 24 emit a laser beam in the same direction. The laser beams emitted by laser modules 21 to 24 are parallel optical beams.

Phosphor wheel 40 includes phosphor layer 41 and reflective diffusion plate 42. Phosphor layer 41 and reflective diffusion plate 42 are formed on the same surface of a rotating substrate (wheel). FIG. 6 shows a front view of phosphor wheel 40.

As shown in FIG. 6, phosphor layer 41 is formed in an annular shape along the circumferential direction in a region on the outer peripheral side of one surface of rotating substrate 40a. Reflective diffusion plate 42 is formed in an annular shape along the circumferential direction in a region on the inner peripheral side of one surface of rotating substrate 40a, that is, in a region inside phosphor layer 41. Reflective diffusion plate 42 is similar to reflective diffusion plate 132 described in the first embodiment and is a known diffuser that reflects and diffuses a laser beam. Phosphor layer 41 includes a phosphor that emits yellow fluorescent light. Between phosphor layer 41 and rotating substrate 40a, a reflecting member is provided that reflects the fluorescent light incident from phosphor layer 41 toward phosphor layer 41. Incidentally, by configuring the rotating substrate 40a from a metal material, the reflecting member can be omitted.

Referring again to FIGS. 4 and 5, optical path forming member 30 includes condenser lens 300, reflection plates 301 to 305, MLA (microlens array) 306, dichroic mirror 307, and collimator lenses 308 and 309. MLA 306 is a light-uniformizing element for forming the illuminated surface of phosphor layer 41 into a uniform illumination distribution. Dichroic mirror 307 has the characteristic of transmitting, of light in the visible light wavelength range, light in the blue wavelength range and reflecting light in other wavelength ranges.

Collimator lens 308 faces reflective diffusion plate 42 of phosphor wheel 40. The optical axis of collimator lens 308 intersects substantially perpendicularly with the incident surface of reflective diffusion plate 42. Collimator lens 309 faces phosphor layer 41 of phosphor wheel 40. The optical axis of collimator lens 309 intersects substantially perpendicularly with the incident surface of phosphor layer 41.

The optical axis of collimator lens 308 is orthogonal to the optical axes of laser modules 21 to 24. Reflection plates 301 and 302 are disposed at intersections of these optical axes. Reflection plates 301 and 302 each have a through-hole and are parallel to each other. Reflection plates 301 and 302 intersect the optical axis of collimator lens 308 at an angle of approximately 45° and intersect the optical axes of laser modules 21 to 24 at an angle of approximately 45°. Reflection plate 301 is disposed on the collimator lens 308 side.

FIG. 7 is a front view of reflection plate 301. As illustrated in FIG. 7, reflection plate 301 includes through-hole 301*a*. Through-hole 301*a* has a rectangular shape. In one surface of reflection plate 301, the region other than through-hole 301*a* is a reflecting surface. The reflecting surface of reflection plate 301 faces laser modules 22 and 24.

FIG. 8 is a front view of reflection plate 302. As shown in FIG. 8, reflection plate 302 includes two through-holes 302*a* and 302*b*. Each of through-holes 302*a* and 302*b* has a rectangular shape. Through-hole 302*b* is larger than through-hole 302*a*. Through-hole 302*a* is larger than through-hole 301*a* described above. On both surfaces of reflection plate 302, the regions other than through-holes 302*a* and 302*b* are reflecting surfaces. One reflecting surface of reflection plate 302 faces laser modules 21 and 23.

Laser modules 21 and 23 emit laser beams toward reflection plate 302. Laser modules 22 and 24 emit laser beams toward reflection plate 301. Condenser lens 300 is provided between laser module 23 and reflection plate 302. Reflection plates 301 and 302 divide light emitted from laser source unit 20 including laser modules 21 to 24 into a first laser beam (blue light) and a second laser beam (excitation light). Here, light emitted from laser module 23 is used as the first laser beam, and light emitted from laser modules 21, 22, and 24 is used as the second laser beam.

FIG. 9 schematically illustrates the optical path of the first laser beam that is blue light. As shown in FIG. 9, the first laser beam emitted from laser module 23 is condensed by condenser lens 300 and passes through through-hole 302*b* of reflection plate 302. The first laser beam that passes through through-hole 302*b* is reflected by the reflecting surface of reflection plate 301. The first laser beam reflected by the reflecting surface of reflection plate 301 is reflected by reflection plates 303 and 304 and again passes through through-hole 302*b* of reflection plate 302. The first laser beam that passes through through-hole 302*b* passes through through-hole 301*a* of reflection plate 301. The first laser beam that passes through through-hole 301*a* passes through collimator lens 308 and enters reflective diffusion plate 42. Through-hole 301*a* is disposed in the vicinity of the condensing position of condenser lens 300. Here, the condensing position corresponds to, for example, a focal position determined by the focal length of condenser lens 300.

FIG. 10 schematically illustrates the optical path of a second laser beam that is excitation light. As shown in FIG. 10, the second laser beams emitted from laser modules 21, 22, and 24 are reflected by the reflecting surfaces of reflection plates 301 and 302. Here, the second laser beam emitted from laser module 21 is reflected by the reflecting surface of reflection plate 302, and the reflected light enters reflection plate 304. The second laser beam emitted from laser module 22 is reflected by the reflecting surface of reflection plate 301, and the reflected light passes through through-hole 302*a* of reflection plate 302 and enters reflection plate 304. The second laser beam emitted from laser module 24 is reflected by the reflecting surface of reflection plate 301, and the reflected light passes through through-hole 302*b* of reflection plate 302 and enters reflection plate 304. Reflection plates 301 and 302 serve to integrate the second laser beams emitted from laser modules 21, 22, and 24. The second laser beam integrated by reflection plates 301 and 302 passes through reflection plates 304 and 305, microlens array 306, dichroic mirror 307, and collimator lens 309 in this order, and enters phosphor layer 41.

FIG. 11 schematically illustrates all optical paths including those of fluorescent light and diffused light. In FIG. 11, portions indicated by black circles correspond to through-holes 301*a* of reflection plate 301 and through-holes 302*a* and 302*b* of reflection plate 302.

As shown in FIG. 11, collimator lens 308 condenses the first laser beam (blue light) on reflective diffusion plate 42. Reflective diffusion plate 42 reflects and diffuses the first laser beam. Collimator lens 308 converts the blue diffused light emitted from reflective diffusion plate 42 into a parallel light flux. Reflection plate 301 reflects the blue light collimated by collimator lens 308 toward dichroic mirror 307.

On the other hand, collimator lens 309 condenses the second laser beam (excitation light) on phosphor layer 41. In phosphor layer 41, the phosphor excited by the second laser beam emits yellow fluorescent light. Collimator lens 309 collimates the yellow fluorescent light (diffused light) emitted from phosphor layer 41. The yellow fluorescent light that is collimated by collimator lens 309 enters dichroic mirror 307.

Dichroic mirror 307 transmits blue light from reflection plate 301 and reflects yellow fluorescent light from collimator lens 309. That is, dichroic mirror 307 color-synthesizes the blue light and the yellow fluorescent light into one optical path. The color-synthesized light is output light (white) of the light source device of the present embodiment.

In the light source device of the present embodiment, the first laser beam, which is incident light to reflective diffusion plate 42, passes through through-hole 301*a*, and the diffused light, which is reflected light from reflective diffusion plate 42, is reflected by reflection plate 301, whereby the incident light is separated from the reflected light. According to this separation configuration, as in the first embodiment, the first laser beam can be made substantially perpendicularly incident to reflective diffusion plate 42, and the center ray of the diffused light and the first laser beam can be made substantially coincident with each other. Therefore, since collimator lens 308 can be disposed close to and facing reflective diffusion plate 42, it is possible to prevent an increase in the size of collimator lens 308. Furthermore, since the diffusion angle of the diffused light incident to collimator lens 308 from reflective diffusion plate 42 can be increased, speckle noise can be sufficiently reduced. Further, since the optical path forming member can be arranged two-dimensionally, the light source device can be miniaturized.

Each of the light source devices of the first and second embodiments described above can be used as the light source device of a projector. The projector includes an optical modulation unit that modulates light emitted from the light source device to form an image, and a projection lens that projects the image formed by the optical modulation unit.

FIG. 12 schematically illustrates the configuration of a projector according to an embodiment of the present invention. The projector includes light source device 90, illumination optical system 91, three optical modulators 92R, 920, and 92B, cross dichroic prism 93, and projection lens 94. Light source device 90, which is the light source device described in any one of the first and second embodiments, emits white light including yellow fluorescent light and blue light.

Illumination optical system 91 separates the white light emitted from light source device 90 into red light for illuminating optical modulator 92R, green light for illuminating optical modulator 92G, and blue light for illuminating optical modulator 92B. Each of optical modulators 92R, 92G, and 92B includes a liquid crystal panel that modulates light to form an image.

Illumination optical system 91 includes fly-eye lenses 5a and 5b, polarization conversion element 5c, superimposing lens 5d, dichroic mirrors 5e and 5g, field lenses 5f and 5l, relay lenses 5h and 5j, and mirrors 5i, 5k and 5m. The white light emitted from light source device 90 enters dichroic mirror 5e via fly-eye lenses 5a and 5b, polarization conversion element 5c, and superimposing lens 5d.

Fly-eye lenses 5a and 5b are arranged so as to face each other. Fly-eye lens 5a and 5b each includes a number of microlenses. Each microlens of fly-eye lens 5a faces a respective microlens of fly-eye lens 5b. In fly-eye lens 5a, light emitted from light source device 90 is divided into a plurality of light beams corresponding to the number of microlenses. Each microlens has a shape similar to the effective display region of the liquid crystal panel and condenses the light beam from light source device 90 in the vicinity of fly-eye lens 5b.

Superimposing lens 5d and field lens 5l direct the principal my from each microlens of fly-eye lens 5a toward the center of the liquid crystal panel of optical modulator 92R and superimpose the image of each microlens on the liquid crystal panel. Similarly, superimposing lens 5d and field lens 5f direct the principal ray from each microlens of fly-eye lens 2a toward the center of each liquid crystal panel of optical modulators 92G and 92B and superimpose the image of each microlens on the liquid crystal panel.

Polarization conversion element 5c aligns the polarization direction of light that passed through fly-eye lenses 5a and 5b with P-polarized light or S-polarized light. Dichroic mirror 5e has a characteristic such that, of visible light, light in the red wavelength range is reflected and light of other wavelength ranges is transmitted.

Light (red) that is reflected by dichroic mirror 5e is irradiated on the liquid crystal panel of optical modulator 92R through field lens 5l and mirror 5m. On the other hand, light (blue and green) that is transmitted through dichroic mirror 5e enters dichroic mirror 5g via field lens 5f. Dichroic mirror 5g has a characteristic such that, of visible light, light in the green wavelength range is reflected and light of other wavelength ranges is transmitted.

Light (green) reflected by dichroic mirror 5g is irradiated to the liquid crystal panel of optical modulator 92G. On the other hand, light (blue) transmitted through dichroic mirror 5g is irradiated to the liquid crystal panel of optical modulator 92B via relay lens 5h, mirror 5i, relay lens 5j, and mirror 5k.

Optical modulator 92R forms a red image. Optical modulator 92G forms a green image. Optical modulator 92B forms a blue image. Cross dichroic prism 93 includes first to third incident surfaces and an exit surface. In cross dichroic prism 93, the red image light enters the first incident surface, the green image light enters the second incident surface, and the blue image light enters the third incident surface. The red image light, the green image light, and the blue image light are emitted from the exit surface on the same optical path.

The red image light, the green image light, and the blue image light emitted from the exit surface of cross dichroic prism 93 are incident to projection lens 94. Projection lens 94 projects the red image, the green image, and the blue image onto a screen.

In the projector described above, by applying the light source device of the first embodiment or the light source device of the second embodiment, the effects described below can be obtained.

First, a problem in a case in which the configuration of the comparative example shown in FIG. 2 is applied to the projector described above will be described.

In the comparative example, laser beam 12-1a is obliquely incident to reflective diffusion plate 132, and as a result, for example, when the cross-sectional shape of the incident light beam is circular, the illumination spot on reflective diffusion plate 132 will have an elliptical shape. In this case, the light beam having the elliptical shape is incident to fly-eye lenses 5a and 5b. For example, if the shape of each of fly-eye lenses 5a and 5b is square and if the projector is designed so that the length of the major axis side of the incident light beam coincides with the width of each of fly-eye lenses 5a and 5b, the length of the short axis side of the incident light beam will be shorter than the width of each of fly-eye lenses 5a and 5b. In this case, since the incident light beam is incident only on a part of fly-eye lenses 5a and 5b, the uniformity is reduced. This problem arises even if the cross-sectional shape of the incident light beam is a shape other than a circular shape (for example, a square shape).

In the comparative example, as shown in FIG. 13, the brightness differs between region A1 and region A2 of collimator lens 122-1. Since region A1 is remote from rotating body 13, the region where the diffused light enters is wide. On the other hand, since region A2 is close to rotating body 13, the region where the diffused light is incident is narrower than that of region A1. The amount of the diffused light that passes through region A1 and the amount of the diffused light that passes through region A2 are the same. Since the area of region A2 is smaller than the area of region A1, the luminance of light that passed through region A2 is higher than the luminance of light that passes through region A1. Therefore, the distribution of the elliptical shape of the light beam incident to fly-eye lenses 5a and 5b also has different intensities on the left and right sides on the major axis side, resulting in a decrease of uniformity.

On the other hand, in the projector in which the light source device of the first embodiment or the light source device of the second embodiment is applied, the first laser beam (12a) is perpendicularly incident to the reflective diffusion plate (132, 42), and it is therefore possible to prevent the above-described decrease in uniformity.

EXPLANATION OF REFERENCE NUMBERS

11 Laser source unit
11a Emitted light
12a First laser beam
12b Second laser beam
13 Rotating body
121 First reflection plate
121a Through-hole
122 First collimator lens
131 Phosphor layer
132 Reflective diffusion plate

The invention claimed is:
1. A light source device comprising:
a laser source unit that emits a laser beam;
  a rotating body in which a phosphor layer and a reflective diffusion plate are provided on a same surface; and an optical path forming member that divides emitted light from the laser source unit into a first laser beam and a second laser beam, irradiates the reflective diffusion plate with the first laser beam, and irradiates the phosphor layer with the second laser beam, wherein the optical path forming member comprises:

a first reflection plate that is provided on an optical path of the first laser beam and that has a through-hole; and a first collimator lens that is provided between the first reflection plate and the reflective diffusion plate, wherein the first laser beam passes through the through-hole and the first collimator lens in that order and enters the reflective diffusion plate, and diffused light, which is reflected light emitted from the reflective diffusion plate, passes through the first collimator lens and enters the first reflection plate, wherein the first collimator lens condenses the first laser beam on the reflective diffusion plate and collimates the diffused light, wherein the optical path forming member further includes a second reflection plate that is arranged parallel to the first reflection plate on an optical path of the emitted light from the laser source unit and that has first and second through-holes, wherein a portion of the emitted light passes through the first through-hole of the second reflection plate, and light that passes through the first through-hole forms the first laser beam, and wherein a remaining portion of the emitted light is reflected by the first and second reflection plates, reflected light from the first reflection plate passes through the second through-hole of the second reflection plate, and light that passes through the second through-hole and reflected light from the second reflection plate form the second laser beam.

2. The light source device according to claim 1, wherein the laser source unit includes a plurality of laser modules, each laser module mounting a plurality of laser diode chips, and light emitted from at least one laser module passes through the first through-hole of the second reflection plate.

3. The light source device according to claim 2, wherein the optical path forming member further includes a condenser lens that is provided between the at least one laser module and the second reflection plate.

4. The light source device according to claim 3, wherein the through-hole of the first reflection plate is disposed at a condensing position of a laser beam condensed by the condenser lens.

5. The light source device according to claim 1, wherein the optical path forming member further includes a dichroic mirror that is provided on an optical path of the second laser beam, the dichroic mirror transmitting the second laser beam and reflecting fluorescent light emitted from the phosphor layer, and wherein the first reflection plate reflects the diffused light emitted from the reflective diffusion plate toward the dichroic mirror, and the dichroic mirror color-synthesizes the diffused light that is reflected by the first reflection plate and the fluorescent light into one optical path.

6. The light source device according to claim 5, wherein the optical path forming member further includes a second collimator lens that is provided between the dichroic mirror and the phosphor layer, and wherein the second collimator lens focuses the second laser beam on the phosphor layer and collimates the fluorescent light.

7. A projector comprising:

the light source device according to claim 1;

an optical modulation unit that modulates light emitted from the light source device to form an image; and a projection lens that projects the image formed by the optical modulation unit.

\* \* \* \* \*